United States Patent [19]
Yang et al.

[11] Patent Number: 5,694,437
[45] Date of Patent: Dec. 2, 1997

[54] DEVICE AND METHOD FOR DATA SIGNAL DETECTION IN THE PRESENCE OF DISTORTION AND INTERFERENCE IN COMMUNICATION SYSTEMS

[75] Inventors: Jian Yang, Mansfied; M. Vedat Eyuboglu, Concord, both of Mass.

[73] Assignee: Motorola, Inc., Schaumburg, Ill.

[21] Appl. No.: 541,841

[22] Filed: Oct. 10, 1995

[51] Int. Cl.$^6$ ............................. H04B 1/10; H04B 25/08
[52] U.S. Cl. ............................ 375/346; 375/348; 375/340
[58] Field of Search ............................ 375/236, 285, 375/340, 346, 348, 350, 229, 232, 231, 233; 364/724.19, 724.2; 333/18 R, 28; 455/296

[56] References Cited

U.S. PATENT DOCUMENTS

| | | | |
|---|---|---|---|
| 4,905,254 | 2/1990 | Bergmans | 375/233 |
| 4,953,183 | 8/1990 | Bergmans et al. | 375/348 |
| 5,111,484 | 5/1992 | Karabinis | 375/348 |
| 5,345,476 | 9/1994 | Tsujimoto | 375/346 |
| 5,550,810 | 8/1996 | Monogioudis et al. | 375/348 |

*Primary Examiner*—Tesfaldet Bocure
*Attorney, Agent, or Firm*—Darlene J. Stockley; Peter Dichiara

[57] ABSTRACT

The present invention provides a device (200, 300, 400) and method (500) in multi-access communications system for reliably receiving burst transmissions from users in the presence of distortion and interference. The signal detector of the invention incorporates separate modules (280, 290; 302, 304; 402, 404) for distortion cancellation and interference suppression. This allows efficient tracking of distortion and interference characteristics.

23 Claims, 4 Drawing Sheets

DEVICE AND METHOD FOR DATA SIGNAL DETECTION IN THE PRESENCE OF DISTORTION AND INTERFERENCE IN COMMUNICATION SYSTEMS

FIELD OF THE INVENTION

The present invention relates generally to detecting a data signal in the presence of distortion and interference in a communication system, and more particularly to adaptive distortion compensation and interference suppression in a multiple-access communication system.

BACKGROUND OF THE INVENTION

In multiple-access communication systems such as the bi-directional Hybrid Fiber Coax (HFC) cable system, multiple users communicate with a single central site or headend. In such systems, the headend typically receives bursts of transmissions from the users, and these transmissions are coordinated by the headend according to a Media Access Control (MAC) protocol, which prevents collisions and provides fair and equitable access to the upstream communication link from the users to the headend.

Typically, the burst signal received at the headend is distorted because of the imperfections of the transmission medium. The headend receiver therefore often includes an equalizer which compensates for the channel distortion. In HFC systems, the channel distortion is mainly due to microreflections in the coaxial cable. Since bursts from different users travel over different physical paths, the channel distortion may be different for each user. Therefore, the headend receiver needs to set-up a new equalizer for each burst received, or remember the equalizer for each user from burst to burst.

In HFC cable systems, the dominant channel impairment is known as the ingress noise. Ingress noise is typically caused by short-wave or amateur radio transmissions which leak into the cable at various points of poor isolation. Often such ingress noise tends to be narrowband relative to the transmission band of the received signal. Narrowband interference suppression schemes may be used to completely eliminate or at least reduce the effects of such narrowband interference.

Some equalizers which are used to compensate for channel distortion may also help suppress interference due to ingress noise. However, such systems are usually not very effective because they cannot track rapid variations in the interference and at the same time provide effective equalization. In addition, such systems may add substantial overhead by requiring the receiver to learn the interference characteristics at the start of each burst.

In the U.S. patent application "Device and method for adaptive narrow band interference suppression in multiple-access communications", by Jian Yang and M. Vedat Eyuboglu, filed on Sep. 11, 1995, incorporated herein by reference, the inventors described a technique for interference suppression that tracks rapid variations of the interference while requiring low overhead for receiver training. However, the technique described in the September 11 patent application is most efficient when the channel distortion is mild, so that the data signal can be recovered without substantial equalization. Thus, there is a need for a device and method for providing effective interference suppression when there is significant channel distortion.

DETAILED DESCRIPTION OF A PREFERRED EMBODIMENT

In the present invention, a device and method for detecting a data signal in the presence of distortion and interference are described which take advantage of the different nature of distortion and interference in the signal received at the headend of a multiple-access communications network such as a HFC network. The interference characteristics in such networks are typically user independent. On the other hand, the distortion typically depends on which user is transmitting and thus varies from burst to burst. The distortion results in the received signal being corrupted by intersymbol interference (ISI), a well known phenomenon. The device and method described in the present invention incorporate separate modules for ISI cancellation and interference suppression. This separation allows the adaptive elements associated with the ISI canceller and the interference suppresser to match the distortion and interference characteristics, respectively. Thus, the adaptive elements may be updated to track the variations of the channel impairments more effectively by taking advantage of the differences between the distortion and the interference. In particular, the interference suppresser uses the same set of adaptive elements from burst to burst, while the adaptive elements of the ISI canceller are used on a per-burst basis.

Although the invention described here is primarily utilized for an HFC cable system, it may also be applied to other types of systems, such as wireless communication systems. In fact, the technique may be applied to any system where it is desirable to deal with distortion and interference separately.

Figure 1:
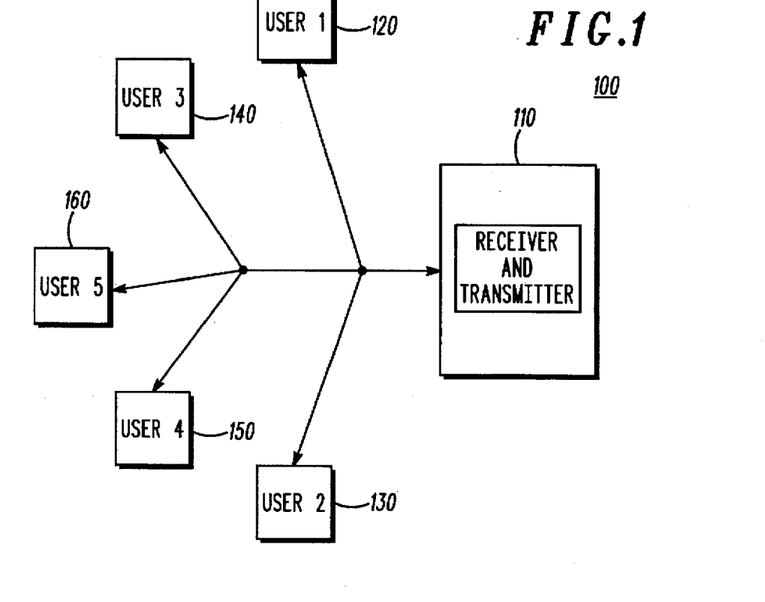
FIG. 1 is a block diagram of a burst multi-access communication system in which the present invention may be utilized.

FIG. 1, numeral 100, shows a multiple-access communication system in which several remote users, (120), (130), (140), (150) and (160) are communicating via a shared medium with a headend, (110), having a receiver and transmitter (170). In particular, the shared medium may be a HFC cable plant. In a bi-directional HFC cable plant, the headend broadcasts to multiple users via a downstream link, while users transmit towards the headend via the upstream link. The upstream link is typically of poor quality and suffers from many impairments. Among these impairments, the dominant one is typically ingress noise which may be of significant magnitude relative to the user transmitted signal due to the noise funneling effect. In addition to ingress noise, the distortion caused by the micro-reflections may also become a significant factor when the data signal is modulated at a high symbol rate. The device for distortion compensation and interference suppression of the present invention may be used in a headend receiver which is receiving upstream burst transmissions from the users in the form of modulated digital data signals.

Figure 2:
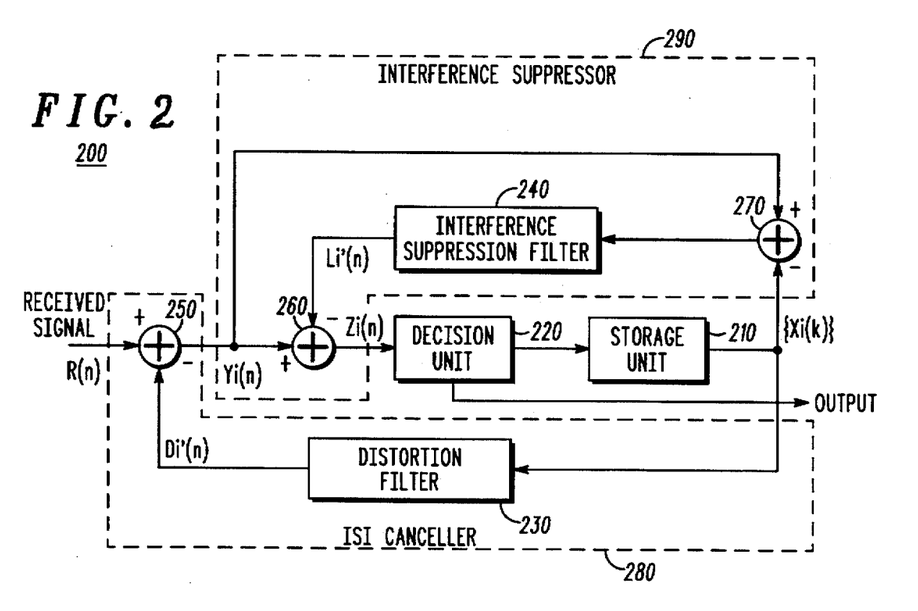
FIG. 2 shows a block diagram of a device for efficiently detecting a data signal in the presence of distortion and interference in accordance with the present invention.

FIG. 2, numeral 200, shows one embodiment of a device for efficiently detecting a data signal in the presence of distortion and interference in accordance with the present invention. The device is utilized for estimating a signal point sequence $\{X(k)\}$, from a received signal that is $\{X(k)\}$ received in the presence of distortion and interference. The device includes: A) a storage unit (210), operably coupled to a decision unit (220), for storing at least a first candidate sequence, wherein each candidate sequence represents a candidate estimated sequence $\{Xi(k)\}$, i=1 ... N where i is a positive integer and N represents a total number of stored candidate sequences; B) an ISI canceller (280), operably coupled to receive at least the received signal, for providing, for each candidate sequence, a first modified received signal having minimized distortion; C) an interference suppresser (290), operably coupled to the ISI canceller (280) and the storage unit (210), for providing a second modified received signal having minimized distortion and interference; and D) the decision unit (210), operably coupled to the interference suppresser (290) for estimating the sequence $\{X(k)\}$, based at least in part on the second modified received signal/signals, and for storing said candidate sequence/sequences in the storage unit (210), and outputting a final estimate of the sequence $\{X(k)\}$.

In one embodiment, the ISI canceller generally includes: A) a subtractor (250), operably coupled to receive the received signal and an estimate of ISI from a distortion filter (230), for subtracting, for each candidate sequence, the estimate of ISI from the received signal to generate the first modified received signal; and B) the distortion filter (230), operably coupled to the storage unit (210), for determining the estimate of intersymbol interference in the received signal, wherein said estimate is computed for a given time index n by the distortion filter (230) based on at least one past sample of the candidate sequence.

Figure 3:
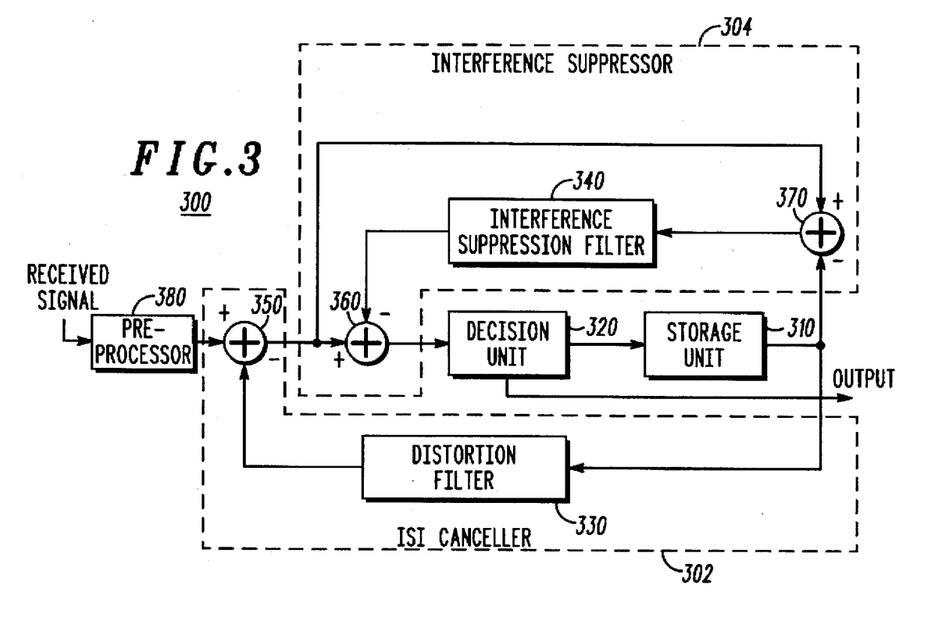
FIG. 3 shows a block diagram of the device of FIG. 2 further incorporating a preprocessor for efficiently detecting a data signal in the presence of distortion and interference.
Figure 4:
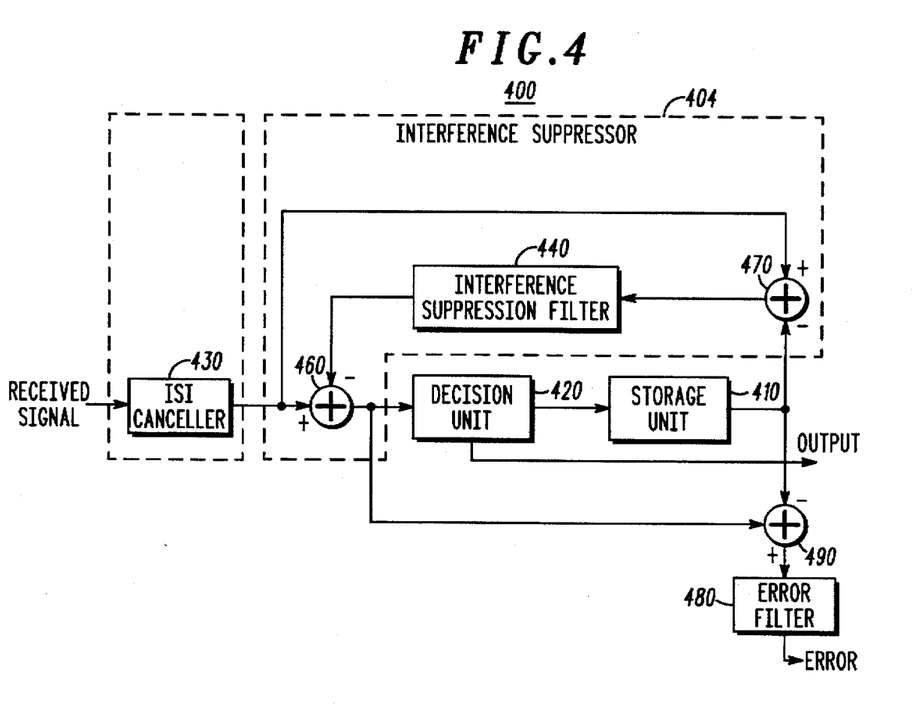
FIG. 4 shows a block diagram of another embodiment of a device for efficiently detecting a data signal in the presence of distortion and interference in accordance with the present invention.

The interference suppresser (290; 304; 404) typically includes: A) a first subtractor (260; 360; 460), coupled to receive the first modified signal and an estimate of interference from an interference suppression filter (240), for subtracting the estimate of interference from the first modified signal to generate the second modified signal; B) an interference suppression filter (240; 340; 440), coupled to receive a difference signal, for determining, for each candidate sequence, the estimate of interference, wherein said estimate of interference at a given time index n is computed by the interference suppression filter based on at least one past sample of the difference signal; and C) a second subtractor (270; 370; 470) coupled to receive the first modified signal and to the storage unit, for subtracting, the candidate sequence from the corresponding first modified signal to provide the difference signal for the interference suppression filter (240; 340; 440).

Where selected, a preprocessor (380) may be coupled immediately prior to the ISI canceller, for receiving the signal and for providing a pre-processed signal having a substantially same amplitude spectrum as the received signal with minimum phase distortion.

The input to the device for signal detection, hereafter designated the signal detector, is the symbol-rate output from a receiver front end. The input signal R(n) at instant n consists of the transmitted symbol for this instant, X(n), the ISI component D(n) due to distortion, and the interference component I(n) which is typically independent of transmitted symbols X(n), i.e., $$R(n)=X(n)+D(n)+I(n) \quad (1)$$

The signal detector estimates the transmitted symbol sequence $\{X(k)\}$.

The signal detector shown in FIG. 2 is based on sequence estimation. Its operation is as follows: The storage unit (210) stores the candidate sequences, each of which consists of the history samples of a candidate estimated sequence $\{Xi(k), k<n\}$, i=1 ... N. Here, n is an integer representing the index for the current sample and N is the total number of candidate sequences stored.

Each of the candidate sequences $\{Xi(k)\}$ is processed by the distortion filter (230) to produce an estimate Di'(n) of the ISI component D(n) in the current sample of the input signal, as, $$Di'(n)=[\text{sum from } k=1 \text{ to } J] \, Xi(n-k)*B(k) \quad (2)$$

The ISI estimate Di'(n) is then subtracted from the input signal to obtain the signal Yi(n), i.e., $$Yi(n)=R(n)-Di'(n) \quad (3)$$

Next, a sequence is formed by subtracting $\{Yi(k), k<n\}$ from the same candidate sequence $\{Xi(k)\}$ used in (2). The resulting difference sequence is processed by the interference suppression filter (240) to produce an estimate Ii'(n) of the interference component I(n) in the current sample of the signal Yi(n), as, $$Ii'(n)=[\text{sum from } k=1 \text{ to } L] \, (Yi(n-k)-Xi(n-k))*F(k) \quad (4)$$

The interference estimate Ii'(n) is then subtracted from Yi(n) to obtain the signal Zi(n), i.e., $$Zi(n)=Yi(n)-Ii'(n) \quad (5)$$

Consider the correct sequence $\{Xi(k)\}$, i.e., the sequence that corresponds to the transmitted sequence. If the tap weights B(k) match the distortion characteristics, the ISI may be accurately estimated, i.e., Di'(n)=D(n), approximately. From Eq. (1) and (3), the sequence $\{Yi(k)-Xi(k), k<n\}$ then becomes a good estimate of the history samples of the interference. Typically, the interference has strong correlation between neighboring samples and thus is highly predictable, i.e., if the tap weights F(k) match the interference characteristics, then Ii'(n)=I(n), approximately, particularly when the interference is of narrow bandwidth relative to the transmitted data signal. From Eq. (1), (3) and (5), Zi(n) will be very close to the transmitted symbol X(n). In other words, for the correct sequence $\{Xi(k), k<n\}$ and the correct current symbol X(n), the square of the absolute value of the quantity, $$Zi(n)-X(n)=R(n)-Di'(n)-Ii'(n)-X(n) \quad (6)$$

shall be small.

This metric is computed by the decision unit (220) for each of the Zi(n) and each possible transmitted symbol X(n) for the current sample. There are a total of N Zi(n), each being computed from one of the stored candidate sequences, {Xi(k), k<n} as described above. Among all possible updates for each of the candidate sequences, the decision unit selects the one that has the minimum metric. The updated candidate sequence {Xi(k), k<n+1} is re-stored into the storage unit (210) for the iteration for the next sample.

The output produced by the signal detector of FIG. 2 is the final estimation for the transmitted symbols. The final estimation for a symbol is made when all the candidate sequences merge for the symbol or by tracing back the candidate sequence with the least metric.

Since the ISI canceller (280) and the interference suppresser (290) processing must be carried out for each of the stored candidate sequences, the complexity of the signal detector depends on the number of candidate sequence maintained, i.e. N. In an optimum implementation, N must be at least equal to the number of data points in the constellation raised to the power of max(J,L). Thus, N may be fairly large and accordingly, the device will be high in the complexity. Several schemes exist that may significantly reduce the complexity of the signal detector without sacrificing much performance.

One of such schemes was introduced in the following paper by Eyuboglu and Qureshi, "Reduced-State Sequence Estimation with Set Partitioning and Decision Feedback", IEEE Transactions on Communications, Vol. 36, No. 1, January 1988. This technique is described in Qureshi, U.S. Pat. No. 4,631,736, issued Dec. 23, 1986, and in Eyuboglu, U.S. Pat. No. 4,713,829, issued Dec. 15, 1987, both assigned to the same assignee as this application, and incorporated herein by reference.

The RSSE reduces the number of stored candidate sequences or states by the following two methods:

1) Partition the signal constellation into subsets. Symbols belonging to the same subset are combined into the same state.
2) The partition for each history symbol may vary from symbol to symbol, and more recent symbols may have a finer partition. As a special case, symbols of history longer than a predetermined number (which could be much less than the memory length of the full implementation) are no longer partitioned, i.e., the partition only contains a single subset.

If the partitions are carefully chosen, this technique may result in significantly reduced number of states at the expense of almost negligible performance penalty.

In an extreme case of the RSSE, the storage unit may only keep a single candidate sequence; i.e., N=1. In this case, the decision unit degenerates into a symbol selector which may be implemented by a threshold unit. The signal detector may output the final decision for a symbol immediately after it is determined by the decision unit, i.e., the RSSE degenerates into a symbol-by-symbol detector. In fact, the sequence estimator then becomes a special form of decision feedback equalizer with the filter sections partitioned in a form suitable for separately dealing with distortion and interference. This type of decision feedback equalizer may be viewed as a special case of the signal detector shown in FIG. 2, i.e., a reduced state sequence estimator that maintains only one sequence.

The adaptive elements of the signal detector are the tap weights, B(k) and F(k) of the ISI canceller and the interference suppresser, respectively. To ensure optimal performance, i.e., minimal error estimation, the tap weights should match the distortion and the interference characteristics. A key aspect of the present invention is the partition of the metric computation into the ISI canceller and the interference suppresser. This partition allows the tap weights B(k) to track the distortion while the tap weights F(k) independently track the interference characteristics. This property is of great value in multiple-access systems where independent tracking of distortion and interference allows the design of a more effective system, as discussed earlier.

Many adaptation techniques are known in the art that can be utilized for adjusting the tap weights to achieve the optimal performance. As an example, one could use the Least Mean Square (LMS) algorithm. To ensure that the interference suppresser does not try to compensate for the channel distortion, before the ISI canceller removes most of the ISI, the following additional procedures are recommended:

1) adapt tap weights B(k) based on the signal Yi(n) instead of Zi(n), which is used to adapt F(k). This will ensure that the ISI is removed by the ISI canceller, and thus the adaptation of B(k) and F(k) converge to the unique optimal solution.
2) do not adapt F(k), before B(k) converges. Although 1) guarantees the convergence of the adaptation to the desired solution, before B(k) converges, there will be strong uncancelled ISI in the signal Yi(n). The adaptation of F(k) may try to compromise interference suppression in order to compensate for the uncancelled ISI, resulting in the deviation of F(k) from the optimal solution. Although eventually F(k) will return to the optimal solution, this deviation is nevertheless undesirable. To avoid this, the adaptation of F(k) can be temporarily stopped during the initial training of the ISI canceller and then restarted after B(k) converges.

For best tracking performance, one may maintain multiple (N) sets of tap weights B(k) and F(k), one for each candidate sequence {Xi(k)}. Each set of tap weights is adapted at every symbol iteration after the associated candidate sequence is updated. This requires N adaptations per symbol. Alternatively, one may maintain a single set of tap weights. It can be adapted based on the final decisions for the transmitted symbol sequence {X(k)} and the corresponding Yi(n) or Zi(n). The number of adaptations needed per symbol is reduced to 1 at the expense of some tracking speed. The penalty is either due to the delay that is needed for the final decisions to become available or due to low reliability of low-delay decisions.

The signal detector of FIG. 2 will not achieve the best performance if the distortion in the overall channel response is not minimum phase, or has precursor ISI. As shown in Eq. (1), the input signal is scaled such that the current symbol X(n) has unit gain. In order to handle pre-cursor ISI, the input signal will have to be scaled beyond necessary, thereby enhancing the background noise.

For network plants where pre-cursor ISI is significant, the signal detector of FIG. 2 may be further augmented with a preprocessor of the input signal. FIG. 3, numeral 300, illustrates a device further incorporating an input preprocessor in accordance with the present invention. The preprocessor (380) is typically implemented as a filter of finite impulse response (FIR) type but may also be of infinite impulse response (IIR) type. Ideally, the filter has a flat amplitude response; i.e., an all-pass filter. The phase response of the filter is such that the distortion in the pre-processed input signal is minimum phase.

Since the amplitude response of the preprocessor is flat, the interference characteristic of the pre-processed signal remains the same as that of the input signal. Thus, the adaptive elements of the interference suppresser (304) do not vary with the preprocessor. This is important to ensure that the interference suppresser tracks the interference independent of the distortion, a key advantage provided by the invention. In this device, the ISI canceller (302) and the preprocessor work together to compensate for the distortion independently of the interference characteristic.

FIG. 4, numeral 400, shows another embodiment of a device in accordance with the present invention. The difference between the device of FIG. 2 and that of FIG. 4 is that the ISI canceller (402) in FIG. 4 is of a linear type rather than of a decision feedback type, i.e., the ISI canceller does not take input from the storage unit (410).

The operation of the decision unit, the storage unit and the interference suppresser is the same as that described for the corresponding units in FIG. 2 and is not repeated here.

In this embodiment, the linear ISI canceller consists of a distortion filter (430) which is typically implemented as an FIR filter that filters the input signal to produce an output signal that is substantially ISI free. The interference component in the output signal is minimized by the interference suppresser as discussed earlier with reference to FIG. 2. However, in order to remove the distortion, the distortion filter (430) causes spectrum shaping to the interference and noise. If conventional adaptation techniques are employed for the interference suppresser, the interference suppresser will attempt to compensate for the noise spectrum shaping, which depends on the distortion filter response, which in turn depends on the distortion. This will prevent the interference suppresser from tracking the interference independent of the distortion.

In order to decouple the interference suppresser from the distortion characteristics, the interference suppresser may be adapted by minimizing a filtered version of the error signal, as shown in FIG. 4. The frequency response of the filter (480) is such that the magnitude response is the inverse of that of the distortion filter, while the phase response may be arbitrary. It can be shown that if the error signal is filtered by such a filter, the resulting optimal interference suppresser no longer depends on the noise spectrum shaping due to the distortion filter. In practice, the filter (480) may be implemented as an IIR filter. By properly choosing the phase response, one can ensure the causality and stability of the filter (480) with the desired frequency response.

Although the ISI canceller (402) need not be operated for each of the stored candidate sequences, the interference suppresser (440) requires operation for each. Thus it is still desirable to reduce the complexity of the signal detector (400) by reducing the number of stored candidate sequences. Again, the RSSE technique described with reference to FIG. 2 may be applied. As a special case, the RSSE with a single state degenerates into a special form of a decision feedback equalizer.

The device and method may be embodied at least in one of: an application specific integrated circuit, a field programmable gate array, a microprocessor, and a computer-readable memory, arranged and configured to determine the first modified received signal having minimized distortion and interference in accordance with the scheme described herein.

Figure 5:
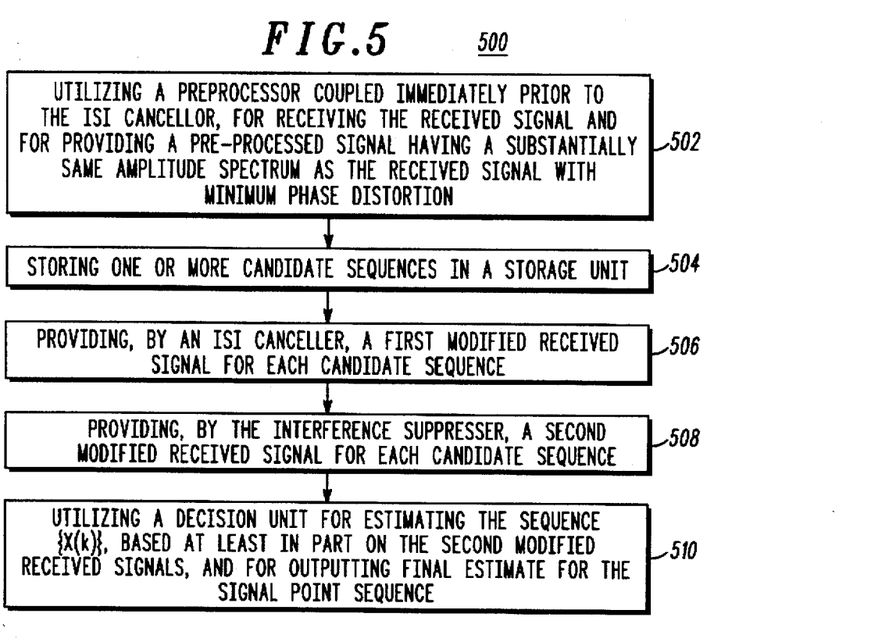
FIG. 5 is a flow chart of one embodiment of steps of a method of providing efficient detection of a data signal in the presence of distortion and interference in accordance with the present invention.

FIG. 5, numeral 500, is a flow chart of one embodiment of steps for the method of the present invention for estimating a signal point sequence {X(k)}, from a received signal that is {X(k)} received in the presence of distortion and interference. The method includes the steps of: A) storing (504) at least a first candidate sequence in a storage unit, wherein each candidate sequence represents a predetermined candidate estimated sequence {Xi(k)}, i×1 . . . N, where i is a positive integer and N represents a total number of stored candidate sequences; and B) providing (506) by an ISI canceller, for each candidate sequence, a first modified received signal having minimized distortion; and C) providing (508) by an interference suppresser, a second modified received signal having minimized distortion and interference; and D) utilizing (510) a decision unit for estimating the sequence {X(k)}, based at least in part on the second modified received signal/signals, and for outputting final estimate for the signal point sequence.

The method may be selected to further include utilizing (502) a preprocessor coupled immediately prior to the ISI canceller, for receiving the signal and for providing a pre-processed signal having a substantially same amplitude spectrum as the received signal with minimum phase distortion.

Figure 6:
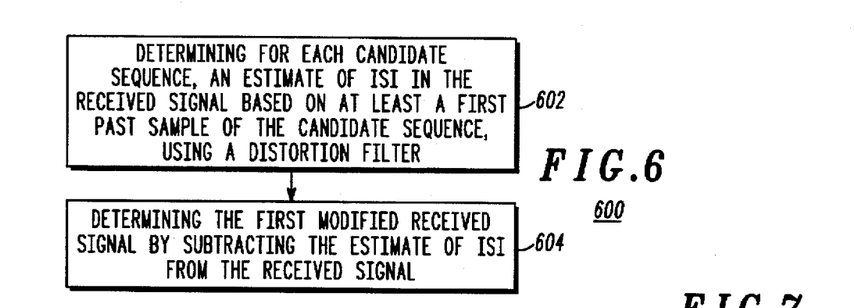
FIG. 6 is a flow chart showing one embodiment of steps for providing, by an intersymbol interference (ISI) canceller, the first modified received signal in accordance with the present invention.

FIG. 6, numeral 600, is a flow chart showing one embodiment of steps for providing the first modified received signal in accordance with the present invention. The steps at a given time index n typically include: A) determining (602), for each candidate sequence, an estimate of ISI in the received signal based on at least a first past sample of the candidate sequence using a distortion filter; and B) determining (604) the first modified received signal by subtracting the estimate of ISI from the received signal.

Figure 7:
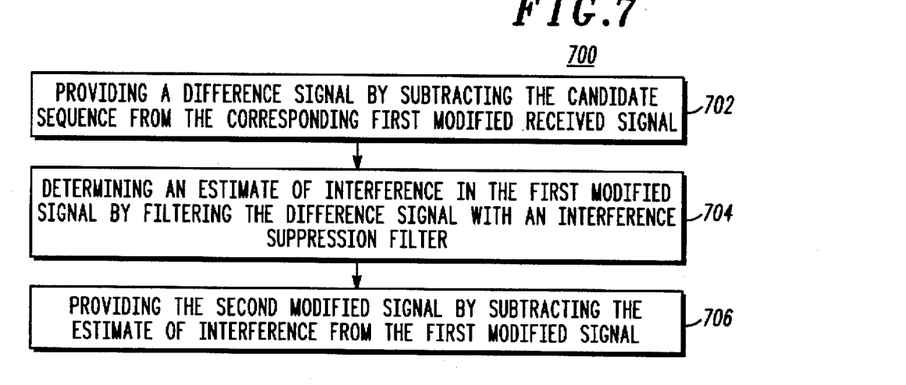
FIG. 7 is a flow chart for one embodiment of steps for providing, by an interference suppresser, the second modified received signal in accordance with the present invention.

FIG. 7, numeral 700, is a flow chart for one embodiment of steps for providing the second modified received signal in accordance with the present invention. The steps at a given time index n typically include: A) Providing (702) a difference signal by subtracting the candidate sequence from the corresponding first modified received signal; and B) Determining (704) an estimate of interference in the first modified signal by filtering the difference signal with a interference suppression filter; and C) Providing (706) the second modified signal by subtracting the estimate of interference from the first modified signal.

Figure 8:
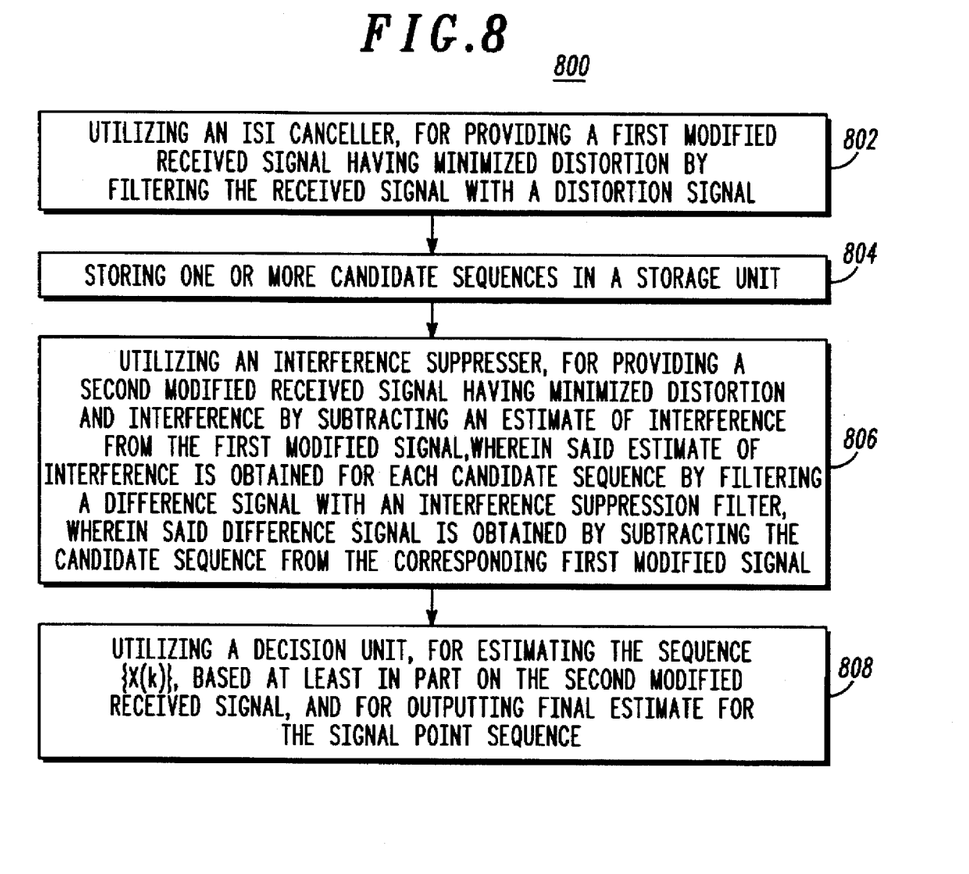
FIG. 8 is a flow chart showing another embodiment of steps for providing efficient detection of a data signal in the presence of distortion and interference in accordance with the present invention.

FIG. 8, numeral 800, is a flow chart showing another embodiment of steps for the method of the present invention for estimating a signal point sequence {X(k)}, from a received signal that is {X(k)}received in the presence of distortion and interference. The method includes the steps of: A) utilizing (802) an ISI canceller, for providing a first modified received signal having minimized distortion by filtering the received signal with a distortion filter; and B) storing (804) at least a first candidate sequence in a storage unit, wherein each candidate sequence represents a predetermined candidate estimated sequence {Xi(k)}, i=1 . . . N where i is a positive integer and N represents a total number of stored candidate sequences; and C) utilizing (806) an interference suppresser, for providing a second modified received signal having minimized distortion and interference by subtracting an estimate of interference from the first modified signal, wherein said estimate of interference is obtained for each candidate sequence by filtering a difference signal with an interference suppression filter, wherein said difference signal is obtained by subtracting the candidate sequence from the corresponding first modified signal; and D) utilizing (808) a decision unit, for estimating the sequence {X(k)}, based at least in part on the second modified received signal, and for outputting final estimate for the signal point sequence.

We claim:

1. A device for estimating a signal point sequence $\{X(k)\}$, from a received signal that is $\{X(k)\}$ received in the presence of distortion and interference, the device comprising:
   A) a storage unit, operably coupled to a decision unit, for storing at least a first candidate sequence, wherein each candidate sequence represents a predetermined candidate estimated sequence $\{Xi(k)\}$, $i=1 \ldots N$, where i is a positive integer and N represents a total number of stored candidate sequences; and
   B) an intersymbol interference canceller, operably coupled to receive at least the received signal, for providing, for each candidate sequence, a first modified received signal; and
   C) an interference suppresser, operably coupled to the intersymbol interference canceller and to the storage unit, for providing a second modified received signal for each candidate sequence; and
   D) the decision unit, operably coupled to the interference suppresser, for estimating the sequence $\{X(k)\}$, based at least in part on the second modified received signal/signals, and for storing said candidate sequence/sequences in the storage unit, and for outputting a final estimate for the signal point sequence.

2. The device of claim 1 wherein N=1.

3. The device of claim 1 wherein the intersymbol interference canceller comprises:
   A) a subtractor, operably coupled to receive the signal and an estimate of ISI from a distortion filter, for subtracting, for each candidate sequence, an estimate of ISI from the received signal to provide the first modified received signal; and
   B) the distortion filter, operably coupled to the storage unit, for determining the estimate of ISI for each candidate sequence.

4. The device of claim 1 wherein the interference suppresser comprises:
   A) a first subtractor, coupled to receive the first received modified signal and an estimate of interference from an interference suppression filter, for subtracting, the estimate of interference from the first received modified signal; and
   B) the interference suppression filter, operably coupled to receive a difference signal from a second subtractor, for determining the estimate of interference for each candidate sequence.
   C) the second subtractor, operably coupled to receive the first received modified signal and to the storage unit, for subtracting the candidate sequence from the corresponding first modified signal to provide the said difference signal for the interference suppression filter.

5. The device of claim 1 further including a preprocessor coupled immediately prior to the intersymbol interference canceller, for receiving the received signal and for providing a pre-processed signal having a substantially same amplitude spectrum as the received signal with minimum phase distortion.

6. The device of claim 1 wherein the device is embodied in at least one of:
   A) an application specific integrated circuit;
   B) a field programmable gate array; and
   C) a microprocessor; and
   D) a computer-readable memory; arranged and configured to determine the first modified received signal having minimized distortion and interference in accordance with the scheme of claim 1.

7. The device of claim 1 further including adaptation of the intersymbol interference canceller based on the first modified received signal and adaptation of the interference suppresser based on the second modified received signal.

8. The device of claim 7, wherein adaptation of the interference suppresser is temporarily stopped during a training period for the intersymbol interference canceller.

9. The device of claim 7, wherein N=1.

10. A device for estimating a signal point sequence $\{X(k)\}$, for a signal that is received in the presence of distortion and interference, the device comprising:
    A) an intersymbol interference canceller, coupled to receive the signal, for providing a first modified received signal, wherein said first modified received signal is computed based on at least a first sample of the received signal using a distortion filter;
    B) a storage unit, coupled to a decision unit, for storing at least a first candidate sequence, each candidate sequence representing a candidate estimated sequence $\{Xi(k)\}$, $i=1 \ldots N$ where i is a positive integer and N represents a total number of stored candidate sequences stored;
    C) an interference suppresser, operably coupled to the intersymbol interference canceller and to the storage unit, for providing a second modified received signal for each candidate sequence; and
    D) the decision unit, operably coupled to the interference suppresser, for estimating the sequence $\{X(k)\}$, based at least in part on the second modified received signal/signals, and for storing said candidate sequence/sequences in the storage unit, and for outputting a final estimate for the signal point sequence.

11. The device of claim 10 wherein the interference suppresser comprises:
    A) a first subtractor, coupled to receive the first modified signal and an estimate of interference from an interference suppression filter, for subtracting, the estimate of interference from the first modified received signal; and
    B) the interference suppression filter, operably coupled to receive a difference signal from a second subtractor, for determining the estimate of interference for each candidate sequence;
    C) the second subtractor, operably coupled to receive the first modified signal and the storage unit, for subtracting the candidate sequence from the corresponding first modified signal to provide the said difference signal for the interference suppression filter.

12. The device of claim 10 further including:
    A) a third subtractor, operably coupled to receive the second modified received signal and to the storage unit, for subtracting at least the first candidate sequence from the corresponding second modified received signal to provide a third modified received signal; and
    B) an error filter, operably coupled to the third subtractor, for filtering the third modified received signal to provide an error signal.

13. The device of claim 12 wherein the interference suppresser is adapted based on minimizing the mean square of the error signal obtained from filtering the third modified received signal, using the error filter whose magnitude frequency response is the inverse of a magnitude frequency response of the distortion filter.

14. A method for estimating a signal point sequence $\{X(k)\}$, from a received signal that is $\{X(k)\}$ received in the presence of distortion and interference, the method comprising the steps of:

A) storing, in a storage unit, at least a first candidate sequence, wherein each candidate sequence represents a predetermined candidate estimated sequence $\{X_i(k)\}$, i=1 ... N, where i is a positive integer and N represents a total number of stored candidate sequences; and B) providing, by an intersymbol interference canceller, a first modified received signal for each candidate sequence; and C) providing, by an interference suppresser, a second modified received signal for each candidate sequence; and D) utilizing a decision unit for estimating the sequence $\{X(k)\}$, based at least in part on the second modified received signals, and for storing said candidate sequence/sequences in the storage unit, and for outputting a final estimate for the signal point sequence.

15. The method of claim 14, wherein N=1.

16. The method of claim 14 wherein providing, by the intersymbol interference canceller, the first modified signal, comprising the steps of:

A) subtracting, for each candidate sequence, an estimate of ISI from the received signal; and B) filtering, by a distortion filter, the candidate sequence to determine the estimate of ISI.

17. The method of claim 14 wherein providing, by the interference suppresser, the second modified received signal, includes the steps of:

A) subtracting an estimate of interference from the first modified signal; and

B) filtering, by an interference suppression filter, a difference signal, for determining the estimate of interference for each candidate sequence; and C) subtracting the candidate sequence from the corresponding first modified signal for providing the difference signal for the interference suppression filter.

18. The method of claim 14 further utilizing a preprocessor coupled immediately prior to the ISI canceller, for receiving the signal and for providing a pre-processed signal having a substantially same amplitude spectrum as the received signal with minimum phase distortion.

19. A method for estimating a signal point sequence $\{X(k)\}$, from a received signal that is $\{X(k)\}$ received in the presence of distortion and interference, the method comprising the steps of:

A) providing, by an intersymbol interference canceller, a first modified received signal, wherein said first modified received signal is computed based on at least a first sample of the received signal using a distortion filter;

B) storing, by a storage unit, at least a first candidate sequence, each candidate sequence representing a candidate estimated sequence $\{X_i(k)\}$, i=1 ... N where i is a positive integer and N represents a total number of stored candidate sequences stored; and C) providing, by an interference suppresser, a second modified received signal for each candidate sequence; and D) utilizing the decision unit for estimating the sequence $\{X(k)\}$, based at least in part on the second modified received signal/signals, and for storing said candidate sequence/sequences in the storage unit, and for outputting a final estimate for the signal point sequence.

20. The method of claim 19 wherein providing, by the interference suppresser, the second modified received signal, includes the steps of:

A) subtracting, an estimate of interference from the first modified signal; and

B) filtering, by an interference suppression filter, a difference signal, for determining the estimate of interference for each candidate sequence;

C) subtracting the candidate sequence from the corresponding first modified signal to provide the difference signal for the interference suppression filter.

21. The method of claim 19 further including the steps of:

A) subtracting at least the first candidate sequence from the corresponding second modified received signal to provide a third modified received signal; and B) filtering the third modified received signal to provide an error signal.

22. The method of claim 19 wherein providing the step of adapting the interference suppresser based on minimizing the mean square of the error signal obtained from filtering the third modified received signal, using the error filter whose magnitude frequency response is the inverse of a magnitude frequency response of the distortion filter.

23. The method of claim 19 wherein the method is a process whose steps are embodied in least one of:

A) an application specific integrated circuit;

B) a field programmable gate array; and

C) a microprocessor; and

D) a computer-readable memory;

arranged and configured to determine the first modified received signal having minimized distortion and interference in accordance with the scheme of claim 19.

* * * * *